(12) United States Patent
Patterson et al.

(10) Patent No.: US 9,950,732 B1
(45) Date of Patent: Apr. 24, 2018

(54) ADJUSTABLE SKI DEVICE FOR WHEELED VEHICLES AND METHOD

(71) Applicants: Glenn Patterson, Calgary (CA); Kelly Patterson, Calgary (CA)

(72) Inventors: Glenn Patterson, Calgary (CA); Kelly Patterson, Calgary (CA)

(*) Notice: Subject to any disclaimer, the term of this patent is extended or adjusted under 35 U.S.C. 154(b) by 0 days.

(21) Appl. No.: 15/474,288

(22) Filed: Mar. 30, 2017

(51) Int. Cl.
*B62B 19/02* (2006.01)
*B62B 17/02* (2006.01)
*B62B 9/00* (2006.01)

(52) U.S. Cl.
CPC .............. *B62B 19/02* (2013.01); *B62B 9/00* (2013.01); *B62B 17/02* (2013.01)

(58) Field of Classification Search
CPC B62B 19/00; B62B 19/02; B62B 9/00; B62B 17/02; B60P 3/07; B60P 3/06; B60P 3/075; B60P 3/077; B60P 3/122; B60P 3/127
See application file for complete search history.

(56) References Cited

U.S. PATENT DOCUMENTS

| | | | | |
|---|---|---|---|---|
| 916 A * | 9/1838 | Guyon | ............ | B62B 19/02 280/13 |
| 294,136 A * | 2/1884 | Larkin | ............ | B62B 19/02 280/13 |
| 452,083 A * | 5/1891 | Reece | ............ | B62B 19/02 280/13 |
| 813,231 A * | 2/1906 | Nightingale | ............ | B62B 19/02 280/13 |
| 1,218,128 A * | 3/1917 | Swanson | ............ | B62B 19/02 280/13 |
| 1,449,738 A * | 3/1923 | Ducatt | ............ | B62B 19/02 280/13 |
| 2,081,024 A * | 5/1937 | Turner | ............ | B62B 19/02 280/13 |
| 2,352,966 A * | 7/1944 | Morando | ............ | B62B 19/02 280/13 |
| RE22,544 E * | 9/1944 | Tinnerman | ............ | F25D 23/067 248/241 |
| 2,589,602 A * | 3/1952 | Clark | ............ | B62B 19/02 280/13 |
| 2,899,146 A * | 8/1959 | Barecki | ............ | B60R 22/38 242/378.4 |
| 3,473,818 A * | 10/1969 | Meredith | ............ | B62B 19/02 280/13 |
| 3,581,846 A * | 6/1971 | Janus | ............ | B60T 3/00 188/32 |
| 4,227,633 A * | 10/1980 | Sellberg | ............ | B60P 3/075 224/42.28 |
| 4,251,085 A | 2/1981 | Lageer et al. | | |
| 4,479,657 A | 10/1984 | Reynolds | | |
| 4,875,822 A * | 10/1989 | Nespor | ............ | B60P 3/077 280/402 |
| 5,316,421 A * | 5/1994 | Bullock | ............ | B60P 3/077 410/10 |
| 5,427,390 A * | 6/1995 | Duncan | ............ | B62B 19/02 280/13 |

(Continued)

*Primary Examiner* — Jacob B Meyer
(74) *Attorney, Agent, or Firm* — Integrity Patent Group, PLC; Edwin Wold

(57) ABSTRACT

An adjustable ski device is disclosed herein. A ski attached to an adjustable wheel binding, to be used on strollers and chariots, with a quick release mechanism, which can be fitted and removed to and from the vehicles existing wheels.

17 Claims, 14 Drawing Sheets

(56) References Cited

U.S. PATENT DOCUMENTS

| | | | |
|---|---|---|---|
| 6,558,092 B1* | 5/2003 | Woodruff | B60P 7/083 |
| | | | 410/103 |
| 6,682,082 B1* | 1/2004 | Dalen | B60P 3/36 |
| | | | 280/10 |
| 6,708,989 B1* | 3/2004 | Braun | A63C 5/085 |
| | | | 280/13 |
| 8,418,792 B2* | 4/2013 | Rivard | B62B 19/02 |
| | | | 180/182 |
| 8,851,485 B2* | 10/2014 | Bach | B62K 13/00 |
| | | | 280/13 |
| 9,027,939 B2* | 5/2015 | Love | B62K 27/003 |
| | | | 280/13 |
| 9,139,216 B1* | 9/2015 | Rivard | B62M 27/02 |
| 9,272,886 B2* | 3/2016 | Kingery | B60P 7/083 |
| 9,469,235 B2* | 10/2016 | Anderson | B60P 3/077 |
| 9,469,328 B2* | 10/2016 | Love | B62B 19/02 |
| 9,610,884 B1* | 4/2017 | Howes | B60P 7/083 |
| 2004/0037664 A1* | 2/2004 | Woodruff | B60P 3/075 |
| | | | 410/12 |
| 2010/0289231 A1* | 11/2010 | Huot | B62B 9/00 |
| | | | 280/13 |
| 2011/0101634 A1* | 5/2011 | Love | B62B 5/068 |
| | | | 280/13 |
| 2011/0253468 A1* | 10/2011 | Rivard | B62B 19/02 |
| | | | 180/190 |
| 2013/0221628 A1 | 4/2013 | Rivard | |
| 2013/0214500 A1* | 8/2013 | Love | B62K 27/003 |
| | | | 280/13 |
| 2013/0313794 A1* | 11/2013 | Bach | B62B 19/02 |
| | | | 280/13 |
| 2015/0001816 A1* | 1/2015 | Bach | B62B 19/02 |
| | | | 280/7.12 |
| 2015/0071725 A1* | 3/2015 | Anderson | B60P 3/077 |
| | | | 410/3 |
| 2015/0291202 A1* | 10/2015 | Love | B62B 19/02 |
| | | | 280/13 |
| 2016/0009309 A1 | 1/2016 | Rivard | |

* cited by examiner

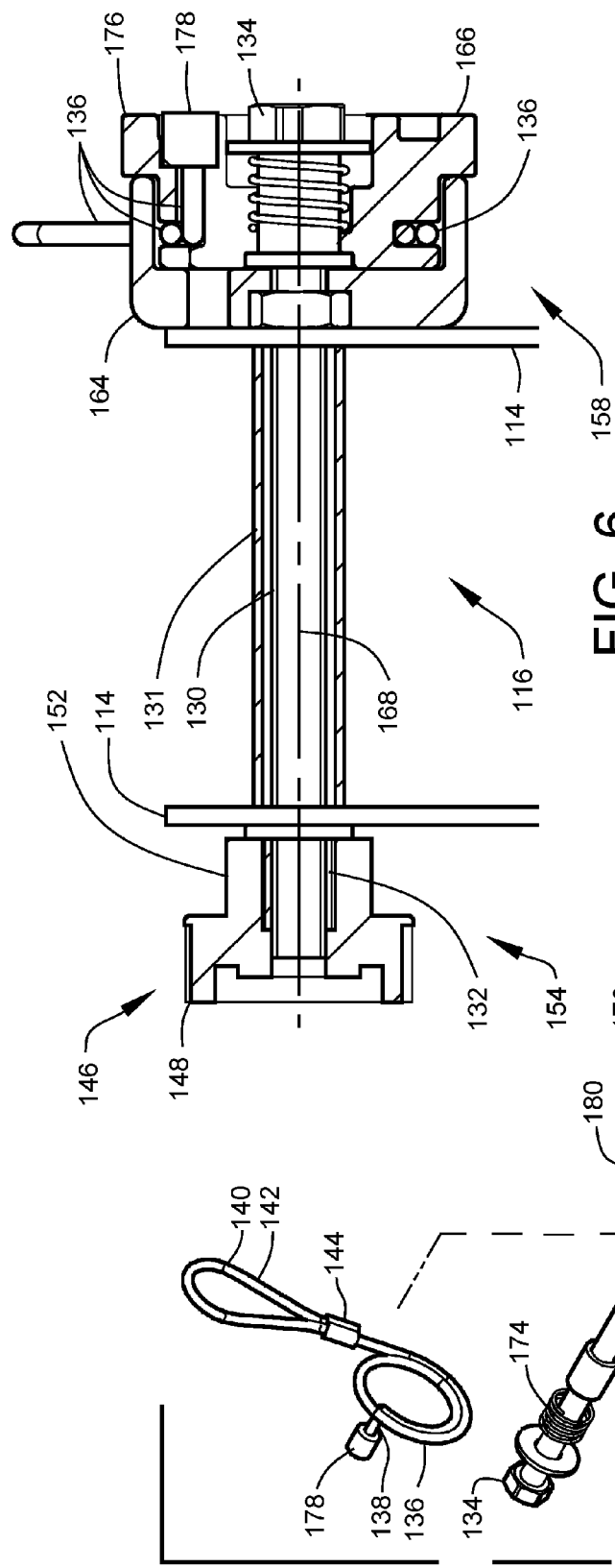

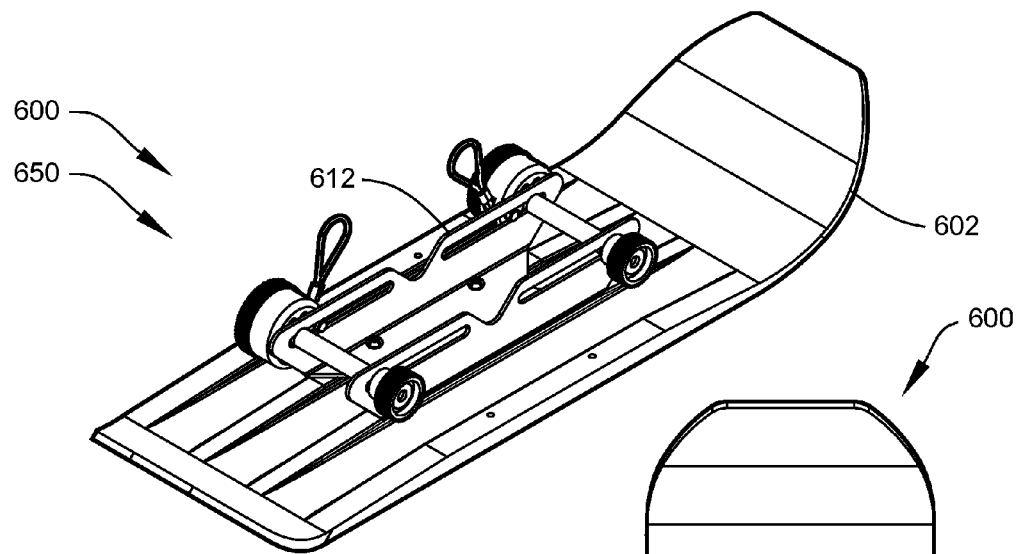
FIG. 19
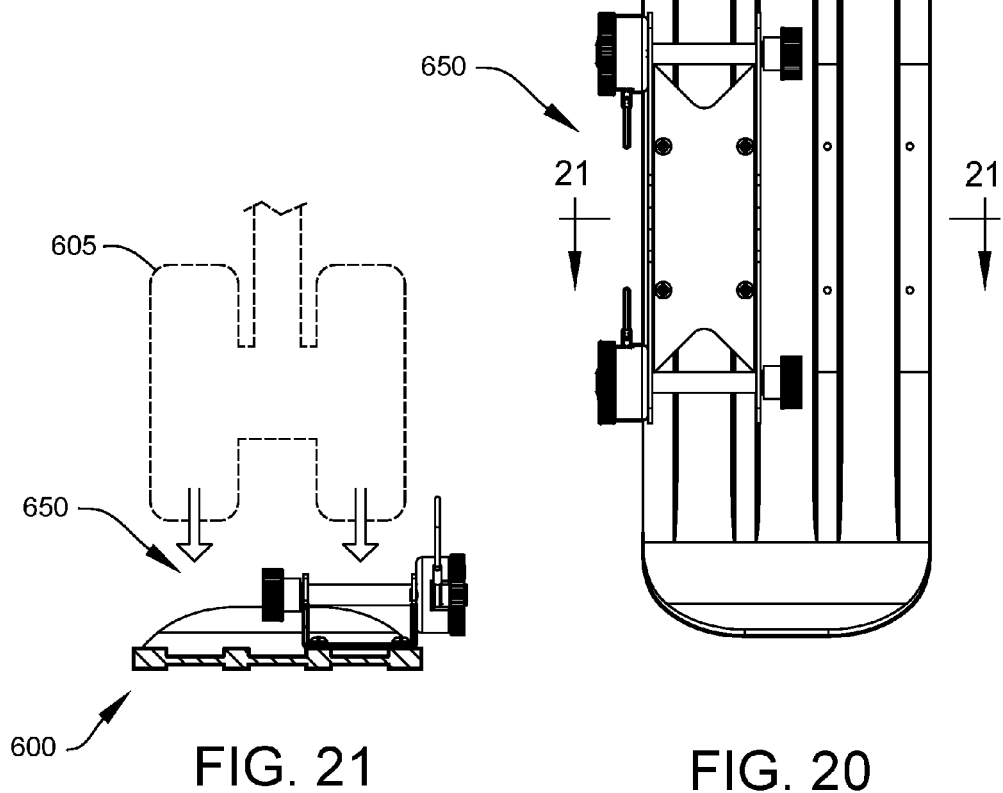
FIG. 21
FIG. 20

ADJUSTABLE SKI DEVICE FOR WHEELED VEHICLES AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of skis for land vehicle with adjustable or detachable support and more specifically relates to vehicles having alternatively-usable wheels and runners (skis) attachable to the wheels.

2. Description of Related Art

The mental and physical benefits of daily exercise are well documented. Unfortunately, many parents of infants and young children find it difficult to fit a regular exercise routine into their busy schedules. One activity that many busy parents find beneficial is daily outdoor walking or running while pushing their child in a stroller or other wheeled apparatus. Many find this activity to be a great way to include exercise within their daily child-care routines. However, maintaining this activity during the winter months can be challenging or impossible in areas where snow is common. It is very difficult, if not impossible to push or pull a wheeled stroller through the snow. A simple and reliable system to convert a child's wheeled stroller or bike trailer into a sleigh for use in snow and ice would benefit many.

By way of example, U.S. Pub. No. 2015/0001816 to Bach et al. relates to an apparatus and methods for increasing the buoyancy of a wheeled vehicle. The described apparatus and methods for increasing the buoyancy of a wheeled vehicle includes an apparatus for increasing the buoyancy of a wheeled vehicle includes a ski to be disposed under at least one tire or wheel of a wheeled vehicle; a boot having a bottom wall secured directly or indirectly to the ski and side walls substantially perpendicular to the bottom wall, wherein the side walls of the boot are configured to laterally constrain the tire or wheel of the wheeled vehicle; and a tire block pin for connecting the side walls of the boot to one another to increase rigidity of the apparatus and to rotationally constrain the tire or wheel of the wheeled vehicle and/or tie downs for securing the wheel to the ski. Methods of using the apparatus are also disclosed.

BRIEF SUMMARY OF THE INVENTION

In view of the foregoing disadvantages inherent in the known skis for land vehicle with adjustable or detachable support art, the present disclosure provides a novel adjustable ski device for wheeled vehicles and method. The general purpose of the present disclosure, which will be described subsequently in greater detail, is to provide a ski attached to an adjustable wheel binding, to be used on strollers and chariots, with a quick release mechanism, which can be fitted and removed to and from the vehicles existing wheels.

In accordance with a preferred embodiment hereof, this invention provides an adjustable ski device relating to the modification of a wheeled vehicle for travel over snow and ice, the adjustable ski device including an elongated ski member having a leading end, a trailing end, an upper surface, and a lower surface, the upper surface and the lower surface extending longitudinally between the leading end and the trailing end, mounted to the upper surface, a wheel binding assembly configured to releasably couple the ski member to a wheel of the wheeled vehicle, the wheel binding assembly including a wheel receiver configured to receive a portion of the wheel, the receiver including opposing sidewalls joined by a base wall extending transversely between the sidewalls and longitudinally along the upper surface, a set of linear slots formed within each of the opposing sidewalls, a wire cable having a first cable end and a second cable end, the second cable end configured to be extendable through an opening of the wheel, and a wire-cable cinching assembly configured to adjust a length of the wire cable extending through the wheel, the wire-cable cinching assembly including a transverse pin slidably engaged within the set of linear slots, the transverse pin including a first pin end and a second pin end, joined with the first pin end, a releasable wire coupler configured to releasably couple the second cable end to the wire-cable cinching assembly, joined with the second pin end and the first cable end, a wire-cable spool adapted to hold the wire cable in a wound configuration, the wire-cable spool configured such that turning of the wire-cable spool in a first rotational direction reduces the distance between the wheel and the wire cable and turning of the wire-cable spool in a second rotational direction increases the distance between the wheel and the wire cable, a first releasable lock configured to releasably lock the wire-cable spool in a user selected position, and a second releasable lock configured to releasably lock the transverse pin at the user selected position within a linear slot of the set. The second releasable lock may be a self-locking hand-operated nut adapted to prevent the nut from freely unwinding if the nut is loosened.

Moreover, it provides such an adjustable ski device wherein each one of the opposing sidewalls includes at least two linear slots. In alternate embodiments, the opposing sidewalls include at least four linear slots. Also, it provides such an adjustable ski device wherein at one portion of the at least four linear slots are arranged in a vertically-stacked relationship. In addition, it provides such an adjustable ski device wherein each linear slot of the set includes a longitudinal axis, and the longitudinal axis of at least two of the linear slots are parallel. And, it provides such an adjustable ski device wherein the linear slots each comprise a length of between about one inch and about twelve inches. Further, it provides such an adjustable ski device wherein each linear slot of the set includes a longitudinal axis, and the longitudinal axis is substantially parallel with the base wall of the wheel receiver.

Even further, it provides such an adjustable ski device wherein the first releasable lock and the second releasable lock are manually operable without the use of tools. Moreover, it provides such an adjustable ski device wherein each one of the opposing sidewalls includes a cut-out configured to accommodate a hub portion of the wheel. Additionally, it provides such an adjustable ski device wherein the leading end and the trailing end of the of the elongated ski member are upwardly swept.

In addition, it provides such an adjustable ski device wherein the wire cable is constructed from polyvinyl chloride (PVC) coated stainless steel aircraft cable. Moreover, it provides such an adjustable ski device wherein the second cable end of the wire cable includes a loop, and the releasable wire coupler is configured to releasably engage the loop. The wire-cable spool may further include a cup-shaped outer housing mounted to the transverse pin, and an inner spool rotatably engaged in a nested position within the cup-shaped outer housing, wherein the transverse pin includes a transverse axis, the cup-shaped outer housing includes a plurality of receiving sockets arranged in a radial pattern about the transverse axis, and the inner spool includes at least one outwardly projecting post member, a spring adapted to bias the post member toward a position of engagement with one of the receiving sockets, and a grip adapted to assist manual manipulation of the inner spool by a user, and the inner spool is adapted to translate along the transverse axis between a position of engagement with the outer housing and a rotatable position disengaged from the outer housing. Further, it provides such an adjustable ski device wherein the first cable end is coupled to the inner spool. Even further, it provides such an adjustable ski device wherein the first releasable lock is enabled by a user-selected engagement of the post member within one of the plurality of receiving sockets.

Even further, it provides such an adjustable ski device wherein the first cable end includes an enlarged stop member, the inner spool includes a stop receiver configured to removably receive the enlarged stop member, and the wire cable may be coupled to and decoupled from the inner spool without the use of tools. Even further, it provides such an adjustable ski device further including set of instructions, and wherein the adjustable ski device is arranged as a kit.

In accordance with another preferred embodiment hereof, this invention provides a method relating to the modification of a wheeled vehicle for travel over snow and ice, the method including the steps of; providing an elongated ski member having a leading end, a trailing end, an upper surface, and a lower surface, the upper surface and the lower surface extending longitudinally between the leading end and the trailing end, providing a wheel binding assembly configured to releasably couple the ski member to a wheel of the wheeled vehicle, arranging the wheel binding assembly to include a wheel receiver configured to receive a portion of the wheel, the receiver including opposing sidewalls joined by a base wall extending transversely between the sidewalls and longitudinally along the upper surface, a set of linear slots formed within each of the opposing sidewalls, a wire cable having a first cable end and a second cable end, the second cable end configured to be extendable through an opening of the wheel, a wire-cable cinching assembly configured to adjust a length of the wire cable extending through the wheel, arranging the wire-cable cinching assembly to include a transverse pin slidably engaged within the set of linear slots, the transverse pin including a first pin end and a second pin end, joined with the first pin end, a releasable wire coupler configured to releasably couple the second cable end to the wire-cable cinching assembly, joined with the second pin end and the first cable end, a wire-cable spool adapted to hold the wire cable in a wound configuration, the wire-cable spool configured such that turning of the wire-cable spool in a first rotational direction reduces the distance between the wheel and the wire cable and turning of the wire-cable spool in a second rotational direction increases the distance between the wheel and the wire cable, a first releasable lock configured to releasably lock the wire-cable spool in a user selected position, and a second releasable lock configured to releasably lock the transverse pin a user selected position within a linear slot of the set, and providing an adjustable ski device by joining the wheel binding assembly to the elongated ski member.

Even further, it provides such a method further including the steps of engaging the wheel in the wheel receiver of the adjustable ski device, moving each transverse pin within a respective linear slot to a position of contact with the wheel, locking each transverse pin within a respective linear slot in the position of contact with the wheel using the second releasable lock, extending the second cable end of the wire cable through the opening of the wheel, releasably coupling the second cable end to the wire-cable cinching assembly, adjusting a distance between the wheel and the wire cable by turning the wire-cable spool of the wire-cable cinching assembly in the first rotational direction, and releasably locking the wire-cable spool in a user selected position to maintain the distance between the wheel and the wire cable.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an adjustable ski device for wheeled vehicles and method, constructed and operative according to the teachings of the present disclosure.

FIG. 5 is a partial exploded view illustrating a wheel binding assembly of the adjustable ski device of FIG. 1, according to an embodiment of the present disclosure.

FIG. 6 is a cross section view of the assembled wheel binding assembly of FIG. 1, according to an embodiment of the present disclosure.

FIG. 19 is a rear perspective view of an alternate adjustable ski device, illustrating an alternate configuration of the alternate adjustable ski device, according to an embodiment of the present disclosure.

FIG. 20 is another top view of the alternate adjustable ski device of FIG. 16, illustrating the alternate configuration of the alternate adjustable ski device, according to an embodiment of the present disclosure.

FIG. 21 is a sectional view through the section 21-21 of FIG. 20, further illustrating the alternate configuration of the alternate adjustable ski device, according to an embodiment of the present disclosure.

The various embodiments of the present invention will hereinafter be described in conjunction with the appended drawings, wherein like designations denote like elements.

DETAILED DESCRIPTION

Figure 1:
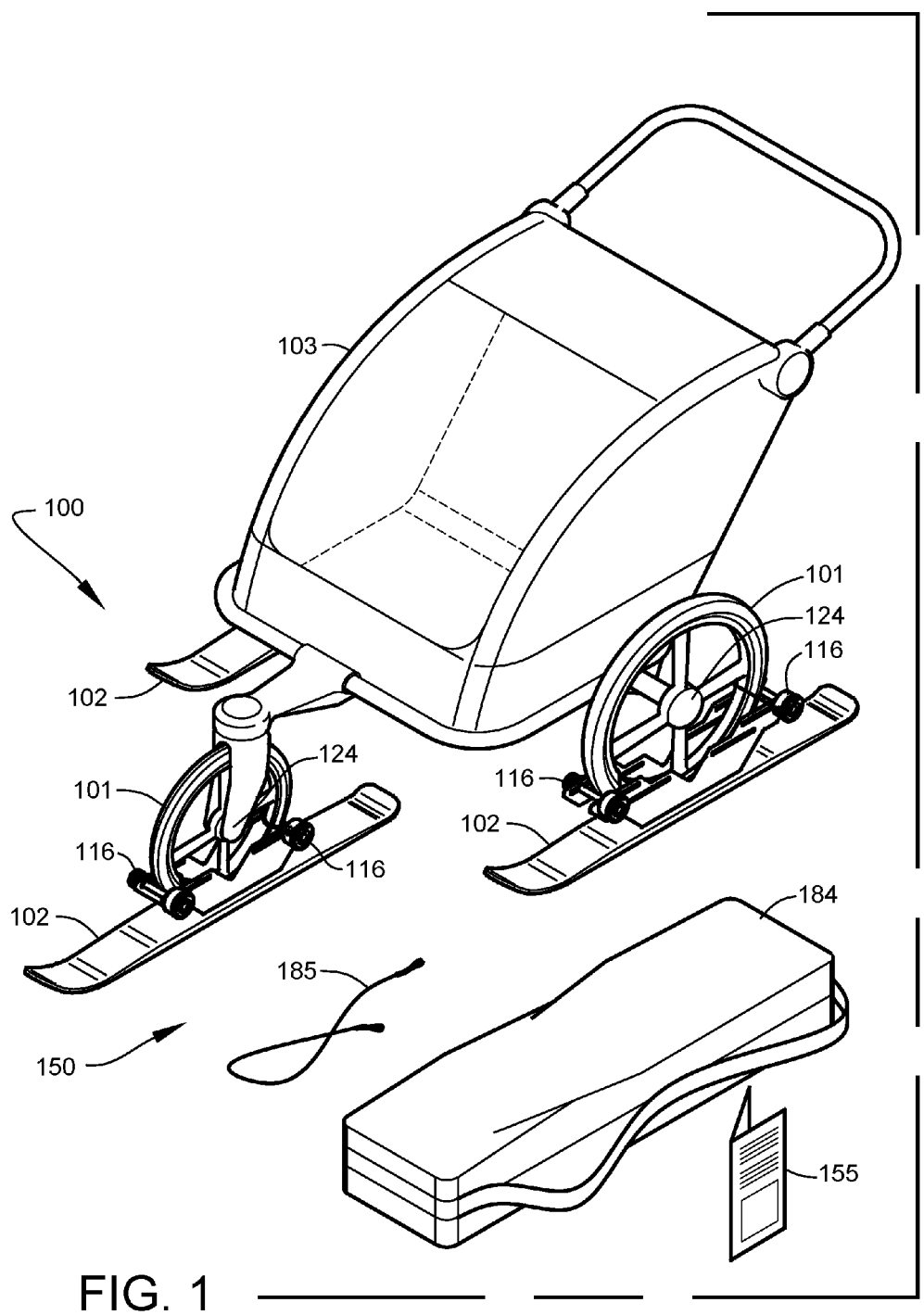
FIG. 1 is a front perspective view of an adjustable ski device during an 'in-use' condition, according to an embodiment of the disclosure.

As discussed above, embodiments of the present disclosure relate to a skis for land vehicle with adjustable or detachable support and more particularly to an adjustable ski device for wheeled vehicles and method as used to improve the vehicles having alternatively-usable wheels and runners (skis) attachable to the wheels.

Generally, the presently-disclosed system includes a set of snow skis that are designed to be quickly and easily attached to a stroller or similar Child Transport System (CTS) using an adjustable wheel binding. When fitted, the system allows the strollers or CTS to travel easier and smoother over snow and ice. The wheel binding includes a unique quick-release mechanism, which can be fitted and removed to and from the existing wheels of the vehicle. The adjustable wheel binding are designed to allow the skis to be fitted without requiring any vehicle modification. The skis are fitted and removed to the vehicle in a manner that avoids causing any adverse effect or compromising the integrity of the vehicle. The adjustable wheel bindings allow the skis to be fitted to and removed from the wheel in less than about one minute for each operation. The adjustable wheel bindings are adapted to fit a range of different sized wheels whilst maintaining their safety and performance. The apparatus may be supplied as a kit including a custom carry bag to store and transport the skis when not in use. The ski is perfectly balanced, keeping it horizontal, preventing the nose or tip of the ski from tipping down during use.

The system may be used by, parents, care givers, guardians, dog owners, therapist etc. to extend their outdoor activities into the winter months. The system adapts to a vast range of wheel sizes allowing the apparatus to be used on the majority of three and four wheel strollers, chariots, bike trailers, dog carriers etc. The system allows individuals to remain active outdoors during the snow covered winter months. The system allows individuals to use their existing wheeled vehicles for winter activities, such as, walking on snow-covered pathways or winter trails, snowshoeing, visiting ski hills, enjoying snow-covered play grounds, dog parks, and jogging in the snow. The system allows individuals to use their existing stroller or CTS all year round, by attaching the stroller skis when snow and ice are present. The system provides the child with a smooth ride by gliding over the compressed pathways and throughout the snow, in their stroller. Daily outdoor exercise is proven to help alleviate postpartum depression and is often a treatment for Seasonal Affective Disorder (SAD). The system allows individuals to adapt their existing equipment for winter use, thus avoiding the need to buy another piece of equipment such as a sled. The system changes the functionality of the wheeled stroller to accommodate snow and ice conditions. When installed, the system has great ergonomics, as the user can engage their whole body weight and leg and back muscles to push the stroller or CTS through the snow and over icy pathways, instead of pulling a device or carrying a child. Carrying a child over snow and ice has measurable risks, due to the potential hazard of slipping, tripping and falling, in addition to the risk of exposure to harsh winter conditions. A child or passenger is less at risk from frostbite and hypothermia when bundled up in their stroller or CTS. The stroller skis of the present disclosure fit special needs strollers and CTS, allowing both children and adults to safety enjoy the great outdoors during the winter, snow covered months.

Referring now more specifically to the drawings by numerals of reference, there is shown in FIGS. 1-15, various views and diagrams illustrating an adjustable ski device 100. FIG. 1 shows the adjustable ski device 100 during an 'in-use' condition 150, according to an embodiment of the present disclosure. The adjustable ski device 100 is designed to be easily attached to an existing wheel 101 of a wheeled vehicle 103, allowing the wheeled vehicle 103 to be used throughout the year, including the winter months. The wheeled vehicle 103 may be a stroller, chariot, child transport system (CTS), bicycle trailer, or similar wheeled carrier.

Figure 2:
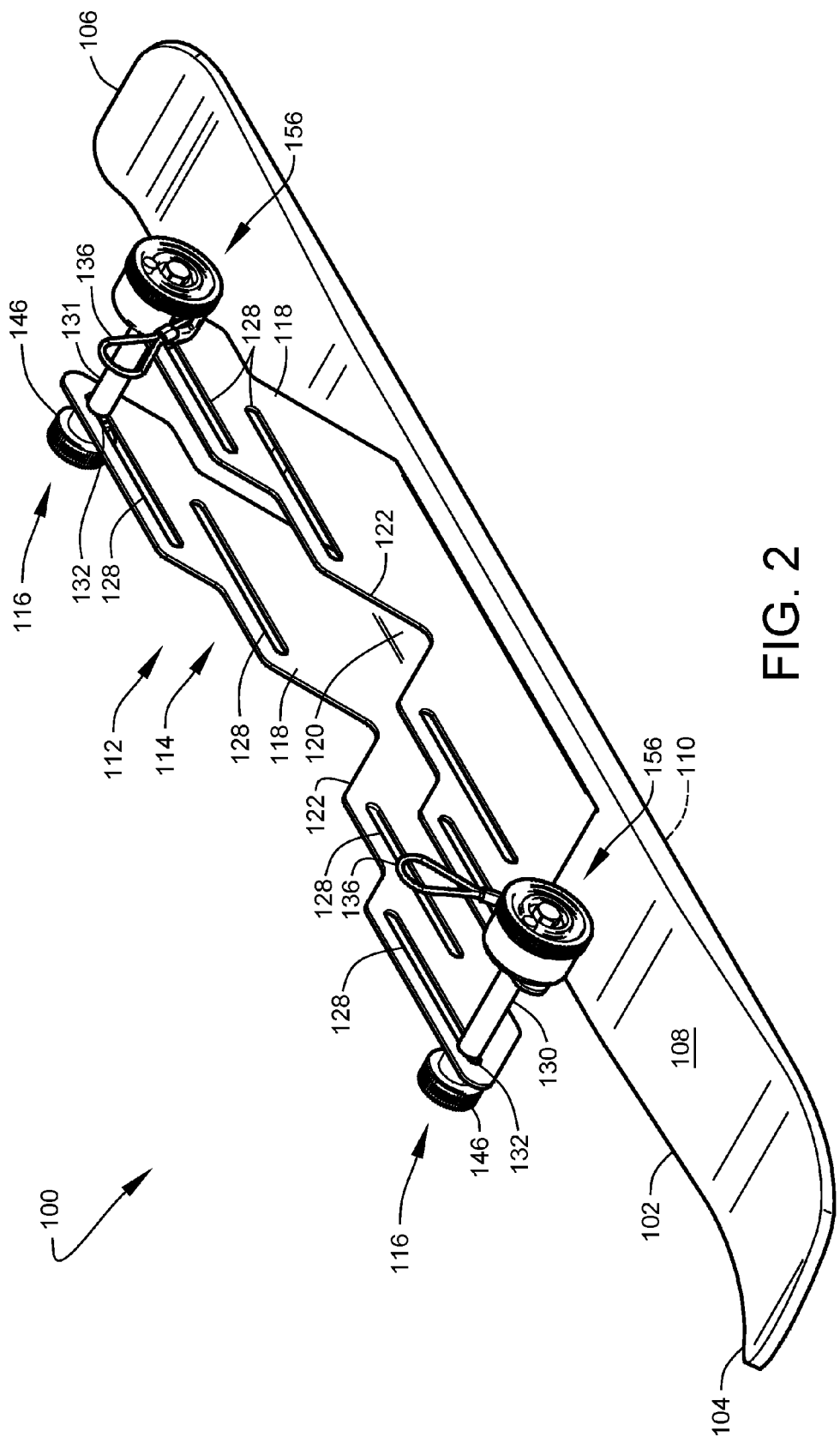
FIG. 2 is a front perspective view of the adjustable ski device of FIG. 1, according to an embodiment of the present disclosure.
Figure 3:
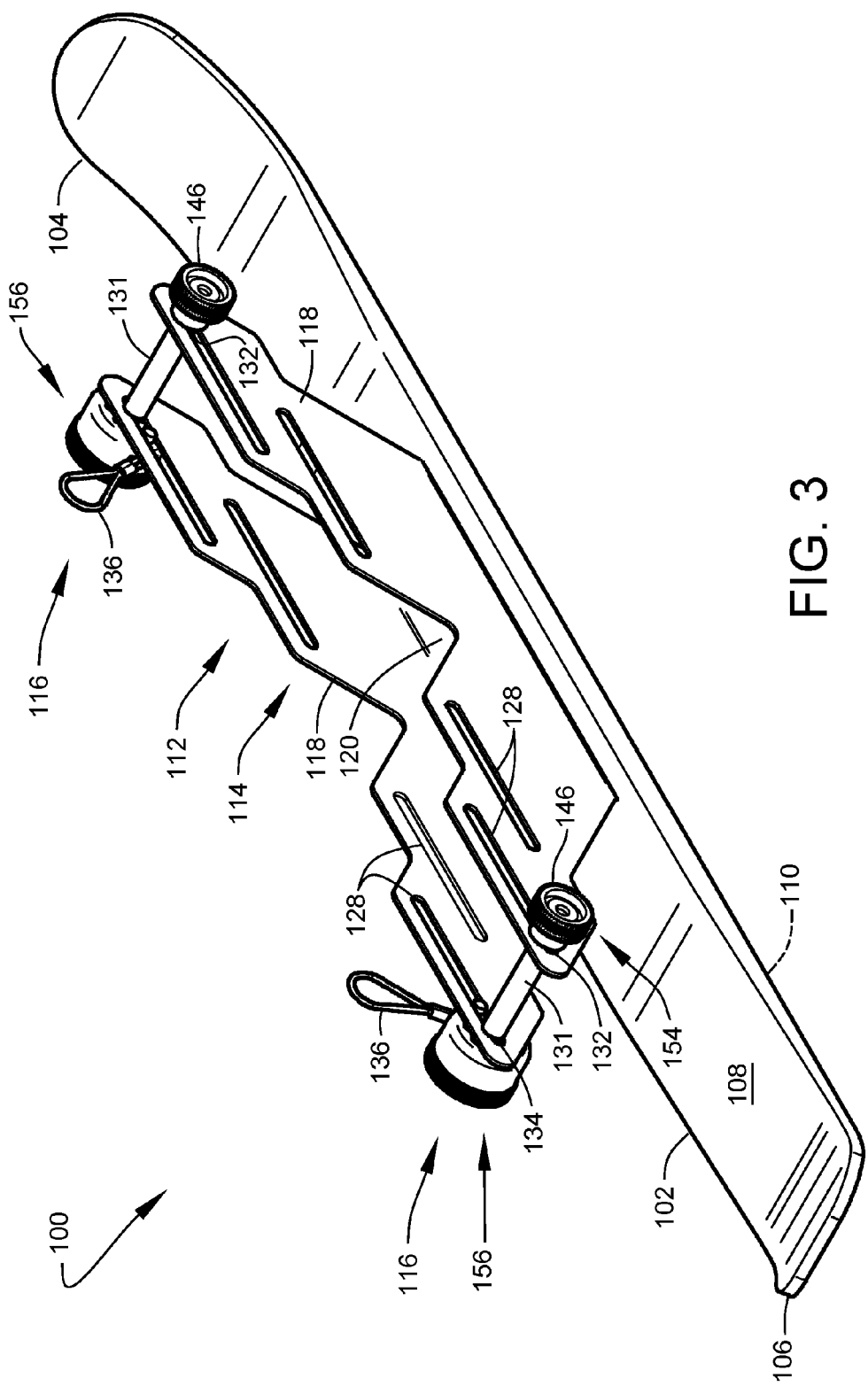
FIG. 3 is a rear perspective view of the adjustable ski device of FIG. 1, according to an embodiment of the present disclosure.
Figure 4:
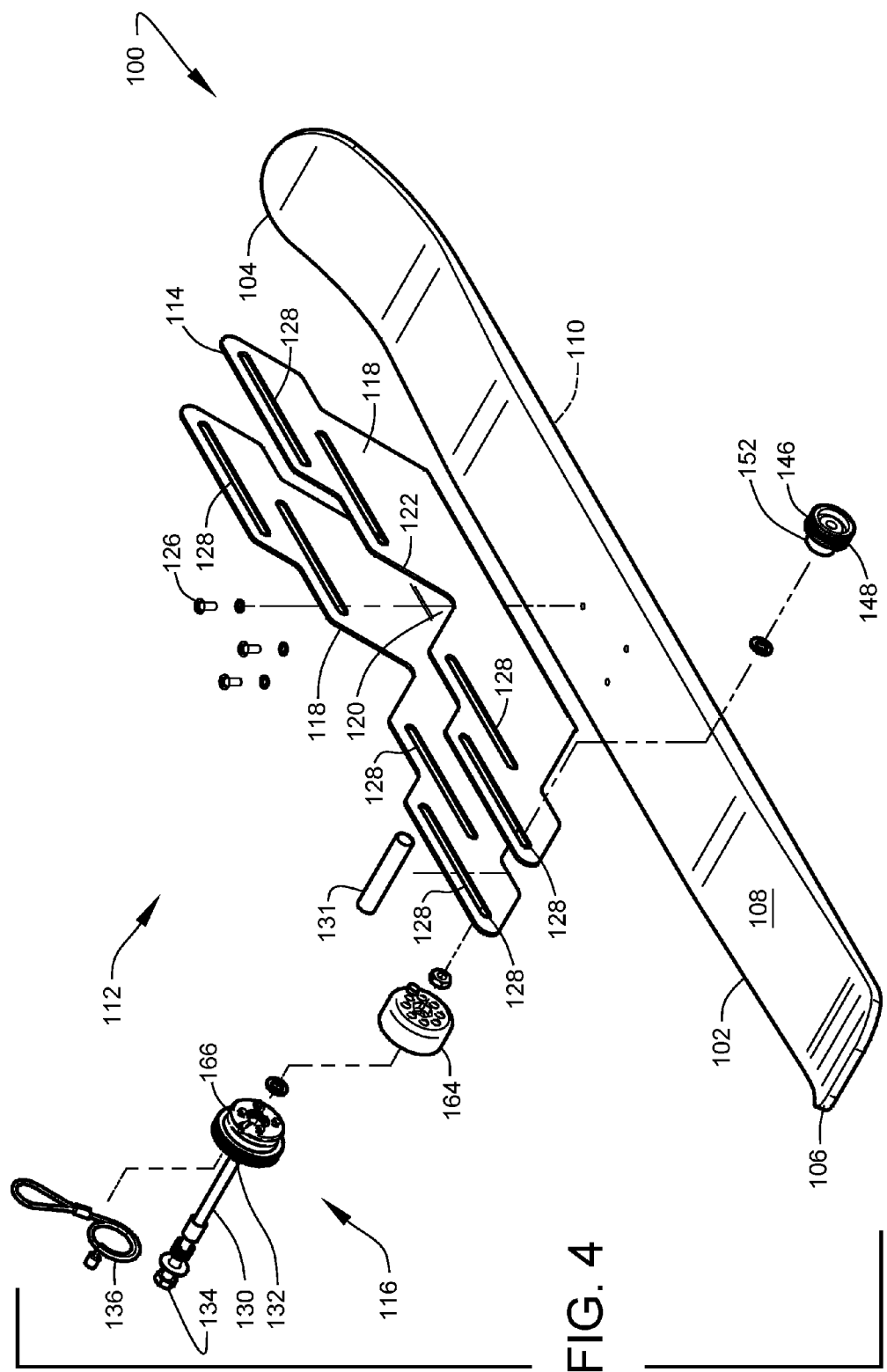
FIG. 4 is an exploded view of the adjustable ski device of FIG. 1, according to an embodiment of the present disclosure.

FIG. 2 is a front perspective view of the adjustable ski device 100 of FIG. 1, according to an embodiment of the present disclosure. FIG. 3 is a rear perspective view of the adjustable ski device 100 of FIG. 1, according to an embodiment of the present disclosure. FIG. 4 is an exploded view of the adjustable ski device 100 of FIG. 1, illustrating the principal subcomponents of the assembly. As Illustrated, the adjustable ski device 100 may include an elongated ski member 102 having a leading end 104, a trailing end 106, an upper surface 108, and a lower surface 110, as shown. The upper surface 108 and the lower surface 110 extend longitudinally between the leading end 104 and the trailing end 106, as shown. Both the leading end 104 and the trailing end 106 of the of the elongated ski member 102 may be upwardly swept, as shown. In one embodiment of the present disclosure, the ski member 102 is about 700 millimeters in length and about 75 millimeters in width without any side cuts.

Figure 8:
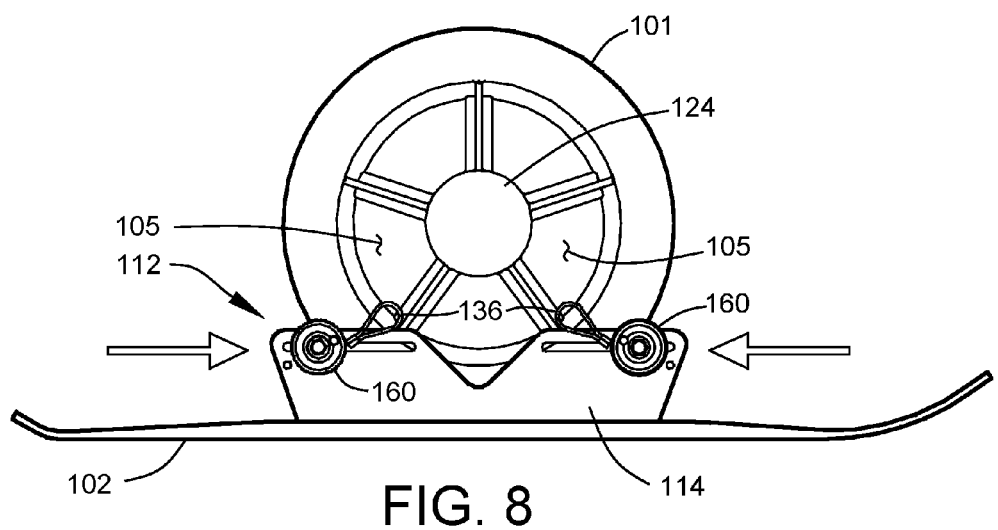
FIG. 8 is a side view of the adjustable ski device of FIG. 1, according to an embodiment of the present disclosure.

A wheel binding assembly 112 is mounted to the upper surface 108, as shown. The wheel binding assembly 112 is configured to releasably couple the ski member 102 to a wheel 101 of the wheeled vehicle 103. The wheel binding assembly 112 may include a wheel-receiving cradle 114 having a set of adjustable wire-cable cinching assemblies 116, as shown. The wheel-receiving cradle 114 may be formed as a single-piece open channel section with a non-adjustable width. The wheel-receiving cradle 114 may include a pair of opposing sidewalls 118 joined by a base wall 120 extending transversely between the sidewalls 118 and longitudinally along the upper surface 108. In this configuration, the wheel-receiving cradle 114 forms a "U" shaped member adapted to receive a portion of the wheel 101, as generally shown in FIG. 1 and FIG. 8. Each one of the opposing sidewalls 118 may include a V-shaped cut out 122 configured to accommodate a hub portion 124 of the wheel 101. The wheel-receiving cradle 114 may be mechanically fastened to the elongated ski member 102 with three screws 126 arranged in a triangular pattern, as shown in FIG. 4.

A set of linear slots 128 are formed within each of the opposing sidewalls 118, as shown. The linear slots 128 are adapted to receive a bar-like transverse pin 130 of the wire-cable cinching assembly 116. The transverse pin 130 includes a first pin end 132 and a second pin end 134. The system allows a user to slide each transverse pin 130 of the wire-cable cinching assemblies 116 within their respective linear slots 128 to place the wire-cable cinching assembly 116 at a selected position adjacent to the wheel 101.

The wire-cable cinching assembly 116 includes a deployable wire cable 136 having a first cable end 138 and a second cable end 140, the second cable end 140 containing a loop 142 that may be passed through an opening 105 of the wheel 101 and secured to the first pin end 132 of the wire-cable cinching assembly 116. The wire-cable cinching assembly 116 is configured to enable a user to selectively adjust the clearance distance between the wheel 101 and the wire cable 136 extending through the wheel 101. In one embodiment of the present disclosure, the wire cable 136 is a PVC coated aircraft wire with a nominal diameter of ¹⁄₁₆ inch an actual diameter of about ³⁄₃₂ inch. The PVC coated aircraft wire is easy to wipe clean and avoids wetting or discoloration of hands or gloves when attaching or removing the ski. The sleeve 144 used to make the loop may be a ³⁄₃₂-inch crimped sleeve. About a ¼-inch strip of the coating is removed from the end during assembly to keep the size of the mechanism to a minimum.

The first pin end 132 of the transverse pin 130 includes a manually-operable locking nut 146 having an enlarged grippable portion 148 and a reduced diameter portion 152 located adjacent to the sidewall 118. Together, the enlarged grippable portion 148 and the reduced diameter portion 152 form a wire coupler 154 configured to releasably engage the loop 142 of the second cable end 140 extending through the wheel 101.

A wire-cable spool 156 is mounted to the second pin end 134 of the wire-cable cinching assembly 116, as shown. The wire-cable spool 156 is adapted to hold the first cable end 138 of the wire cable 136 in a wound configuration. The wire-cable spool 156 is configured such that turning of the wire-cable spool 156 in a first rotational direction reduces the distance between the wheel 101 and the wire cable 136 and turning of the wire-cable spool 156 in a second rotational direction increases the distance between the wheel 101 and the wire cable 136. The wire-cable spool 156 includes a first releasable lock 158 configured to releasably lock the wire-cable spool 156 in a user selected position and wire tension.

The manually-operable locking nut 146 located at the first pin end 132 functions as a second releasable lock 160 configured to releasably lock the transverse pin 130 at a user selected position within its respective linear slot 128. The second releasable lock 160 may be supplied as a size M6 self-locking hand nut to prevent the nut from freely unwinding if the nut is loosened. It should be noted that both the first releasable lock 158 and the second releasable lock 160 are manually operable without the use of tools.

FIG. 5 is a partial exploded view illustrating a wheel binding assembly of the adjustable ski device of FIG. 1, according to an embodiment of the present disclosure. FIG. 6 is a cross section view of the wheel binding assembly of FIG. 5, according to an embodiment of the present disclosure. As above, the adjustable ski device 100 may further include spacer 131 through which the transverse pin 130 passes. The spacer 131 may function to maintain the spacing between the sidewalls 118 as the locking elements are tightened. The wire-cable cinching assembly 116 may further include a cup-shaped outer housing 164 mounted to the transverse pin 130, and an inner spool 166 rotatably engaged in a nested position within the cup-shaped outer housing 164. The cup-shaped outer housing 164 may include a plurality of receiving sockets 170 arranged in a radial pattern about a transverse axis 168 of the transverse pin 130, as shown. The inner spool 166 may include at least one outwardly projecting post member 172, as shown. A spring 174 is provided, which is adapted to bias the post member 172 toward a position of engagement with one of the receiving sockets 170. The inner spool 166 may include a grip 176 adapted to assist manual manipulation of the inner spool 166 by a user. The inner spool 166 is adapted to translate along the transverse axis 168 between a locked position of engagement with the outer housing 164 and a rotatable position disengaged from the outer housing 164. It is noted that operation of the first releasable lock 158 is enabled by a user-selected engagement of the post member 172 within one of the plurality of receiving sockets 170.

The first cable end 138 includes an enlarged stop member 178, as shown in FIG. 5. The stop member 178 may be a ¹⁄₁₆ inch fitting, matching the nominal cable diameter. The inner spool 166 includes a stop receiver 180 configured to removably receive the enlarged stop member 178. This arrangement allows the wire cable 136 to be coupled to and decoupled from the inner spool 166 without the use of tools. When assembled for use, first cable end 138 is coupled to the inner spool 166. As illustrated in FIG. 4 through FIG. 6, the wire-cable cinching assembly 116 may include other miscellaneous assembly components including jamb nuts, spool spacers, washers, etc. Those with ordinary skill in the art will now appreciate that upon reading this specification and by their understanding the art of mechanical assemblies as described herein, methods of joining such mechanical assemblies will be understood by those knowledgeable in such art.

Figure 7:
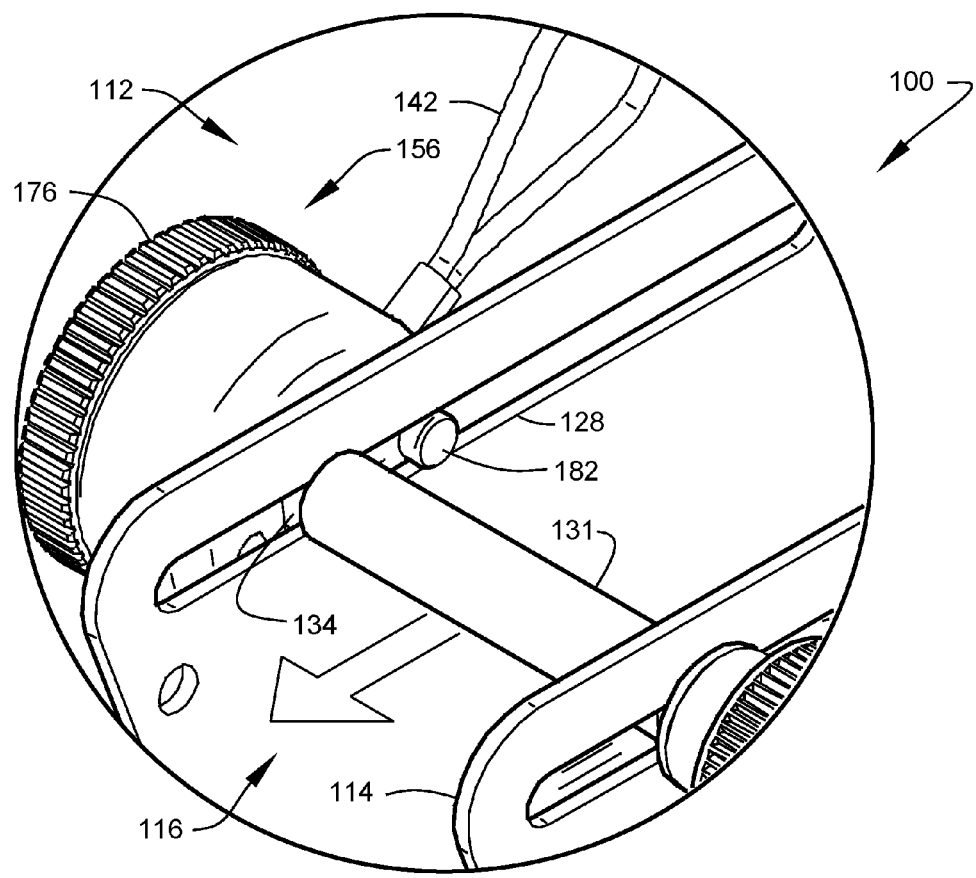
FIG. 7 is a partial perspective view of the installed wheel binding assembly of FIG. 1, according to an embodiment of the present disclosure.

FIG. 7 is a partial perspective view illustrating the operation of the wheel binding assembly 112 of the adjustable ski device 100 of FIG. 1, according to an embodiment of the present disclosure. To install the system, a user first moves the transverse pins 130 to the outside positions of their respective linear slots 128, as generally illustrated in FIG. 7. It should be noted that the back of the outer housing 164 includes an anti-rotation pin 182 that engages the linear slot 128, as shown. The function of the anti-rotation pin 182 is to stop the user from unintentionally unwinding the inner spool 166 without disengaging the inner spool 166 from the outer housing 164. Once the adjustments have been made, the wheels can be lowered into a respective wheel-receiving cradle 114, as shown in FIG. 8.

Figure 9:
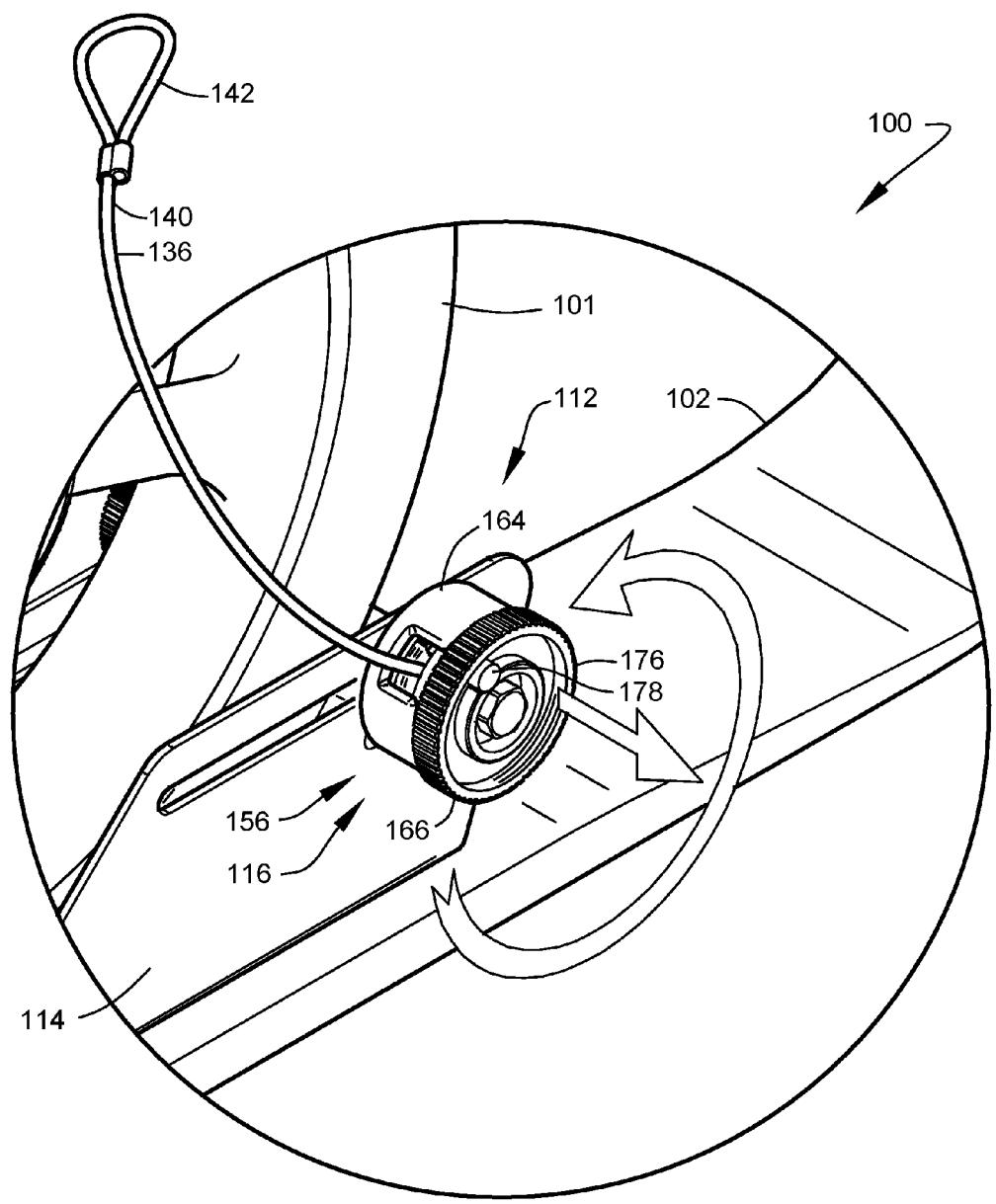
FIG. 9 is a partial perspective view illustrating the operation of the wheel binding assembly of the adjustable ski device of FIG. 1, according to an embodiment of the present disclosure.

FIG. 8 is a side view illustrating the operation of the wheel binding assembly 112 of the adjustable ski device 100 of FIG. 1, according to an embodiment of the present disclosure. FIG. 9 is a partial perspective view further illustrating the operation of the wheel binding assembly 112 of the adjustable ski device 100 of FIG. 1, according to an embodiment of the present disclosure. Next, the grip 176 of the inner spool 166 is pulled outwardly to unlock the inner spool 166 from the outer housing 164 (see FIG. 9). With the wheel binding assembly 116 held in the unlocked position, the user turns the grip 176 to feed out the wire cable 136.

Figure 10:
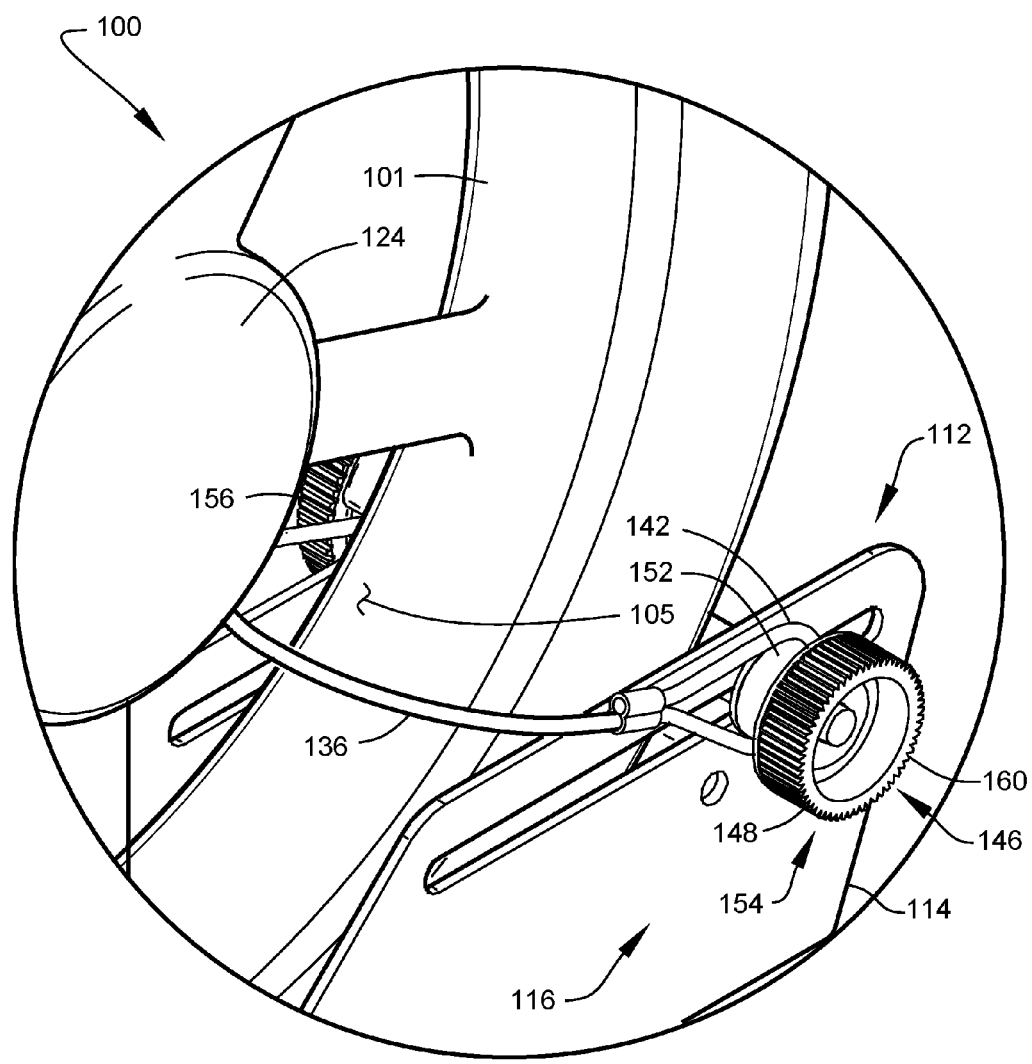
FIG. 10 is a partial perspective view illustrating the operation of the wheel binding assembly of the adjustable ski device of FIG. 1, according to an embodiment of the present disclosure.
Figure 11:
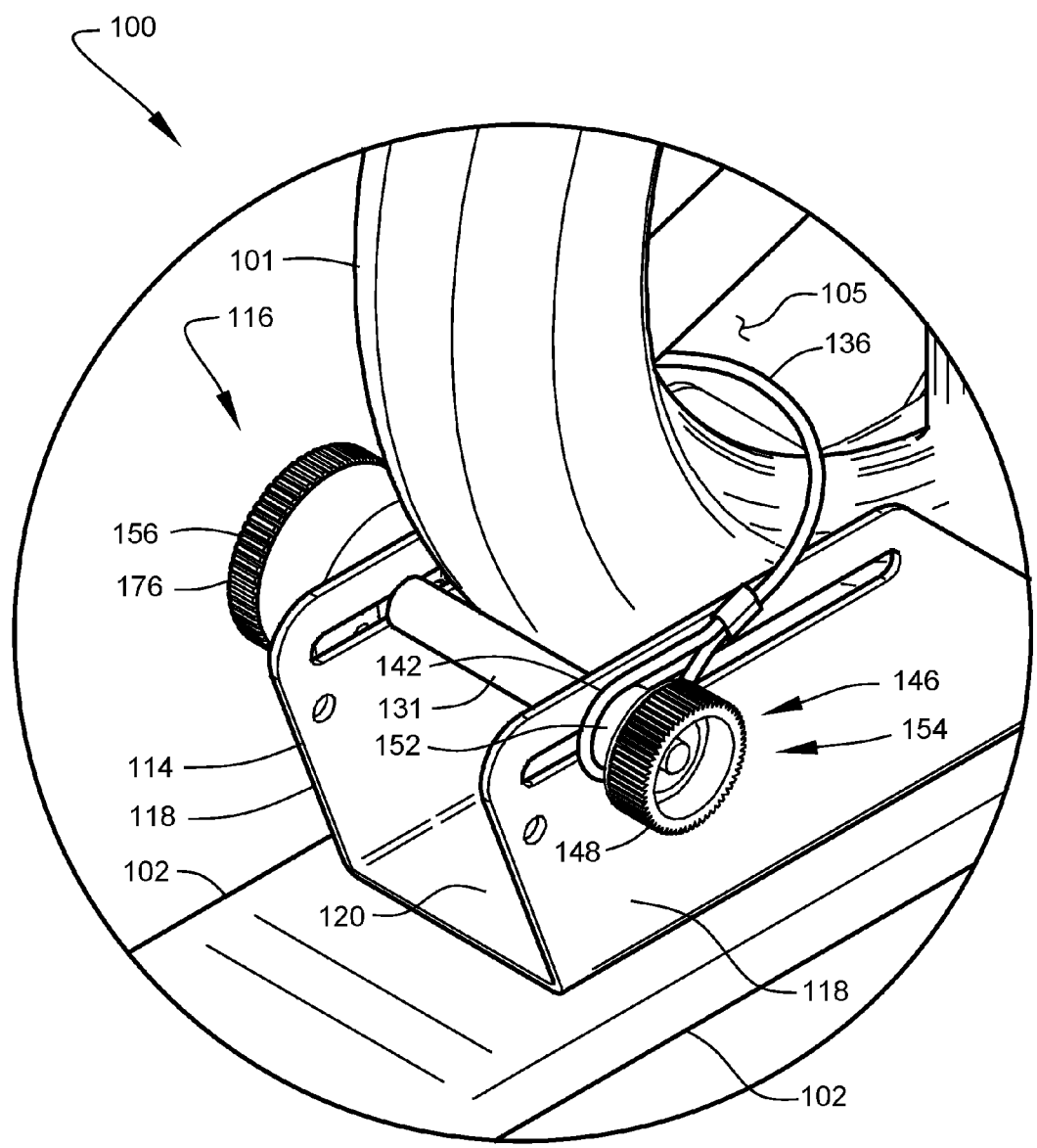
FIG. 11 is a partial perspective view further illustrating the operation of the wheel binding assembly of the adjustable ski device of FIG. 1, according to an embodiment of the present disclosure.

FIG. 10 is a partial perspective view illustrating the operation of the wheel binding assembly 116 of the adjustable ski device 100 of FIG. 1, according to an embodiment of the present disclosure. FIG. 11 is a partial perspective view further illustrating the operation of the wheel binding assembly 116. When there is enough wire cable 136 deployed from the spool to pass through the wheel, the loop 142 is hooked over the wire coupler 154 formed by the locking nut 146, as generally illustrated in both FIG. 10 and FIG. 11.

Figure 12:
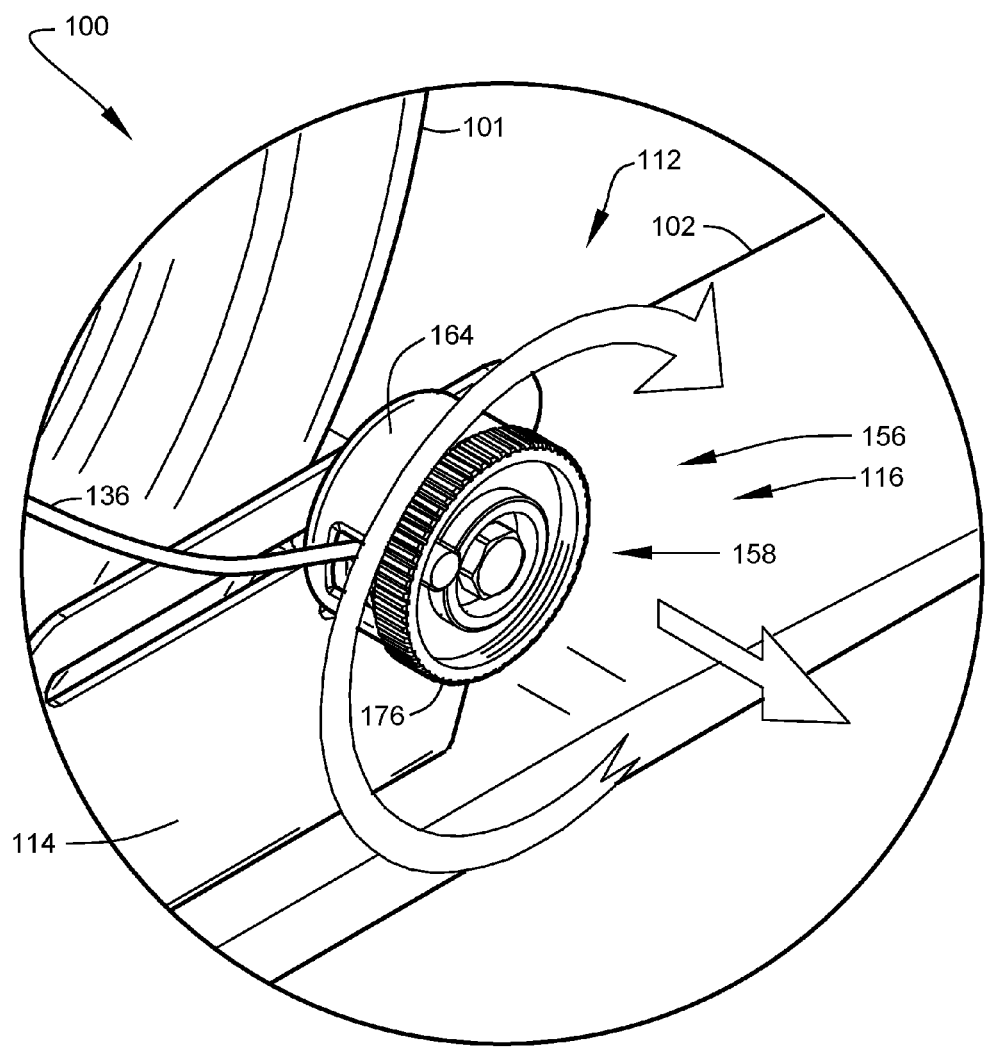
FIG. 12 is a partial perspective view further illustrating the operation of the wheel binding assembly of the adjustable ski device of FIG. 1, according to an embodiment of the present disclosure.

FIG. 12 is a partial perspective view further illustrating the operation of the wheel binding assembly 112 of the adjustable ski device 100 of FIG. 1, according to an embodiment of the present disclosure. Final adjustment of the wheel binding assembly 112 includes removing the slack within the wire cable 136 by rewinding a portion wire cable 136 onto the inner spool 166. This is accomplished by again pulling the inner spool 166 from the outer housing 164 to unlock the assembly, thus allowing the user to wind in the wire cable 136 using the grip 176. In most installations, the wire is loosely cinched about the wheel 101.

Figure 13:
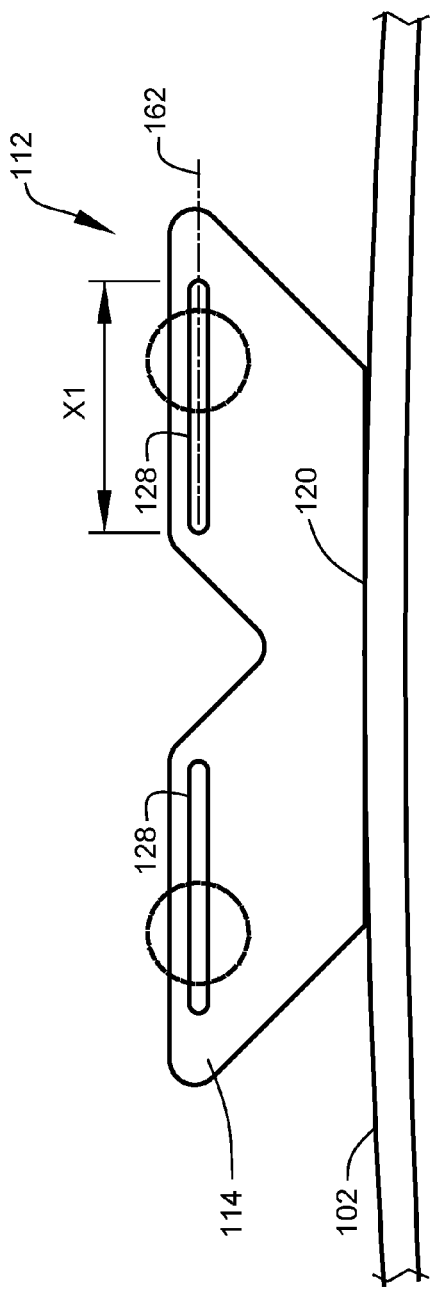
FIG. 13 is a partial side view of the adjustable ski device of FIG. 1, according to an embodiment of the present disclosure.

FIG. 13 is a partial side view of the adjustable ski device 100 of FIG. 1. according to an embodiment of the present disclosure. In depicted embodiment of FIG. 13, each one of the opposing sidewalls 118 includes two linear slots 128. This embodiment is suitable for wheels between about 5 inches to about 16 inches in diameter. In the illustration of FIG. 1, the embodiment of FIG. 13 is shown mounted to the front wheel 101.

Each linear slot 128 of the set includes a longitudinal axis 162, and the longitudinal axis 162 of at least two of the linear slots 128 are parallel. Furthermore, the longitudinal axis 162 is substantially parallel with the base wall 120 of the wheel-receiving cradle 114, as shown. The linear slots 128 may each comprise a length X1 of between about one inch and about twelve inches. Upon reading this specification, it should be appreciated that, under appropriate circumstances, considering such issues as user preferences, design preference, structural requirements, marketing preferences, cost, etc., other slot arrangements such as, for example, alternate sizes, shapes, etc., may be sufficient.

Figure 14:
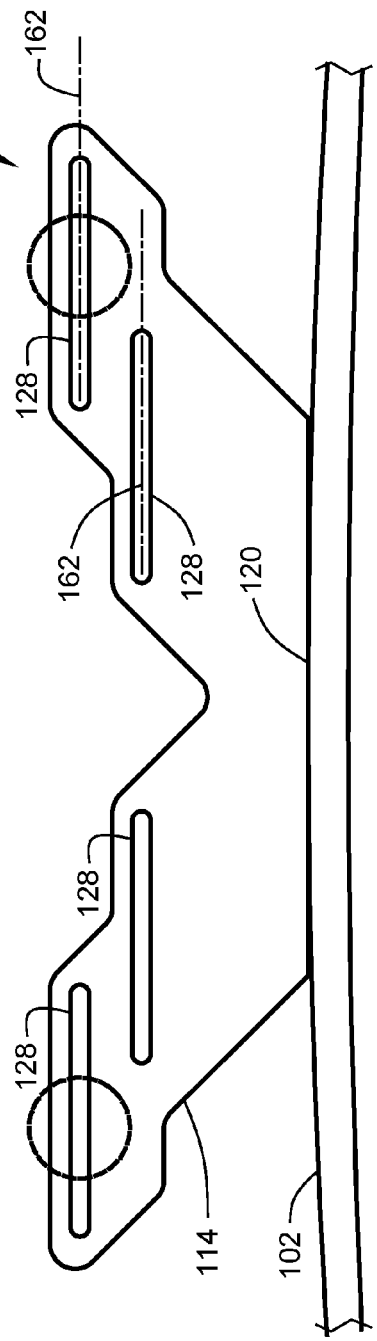
FIG. 14 is a partial side view of the adjustable ski device of FIG. 1, according to an embodiment of the present disclosure.
Figure 15:
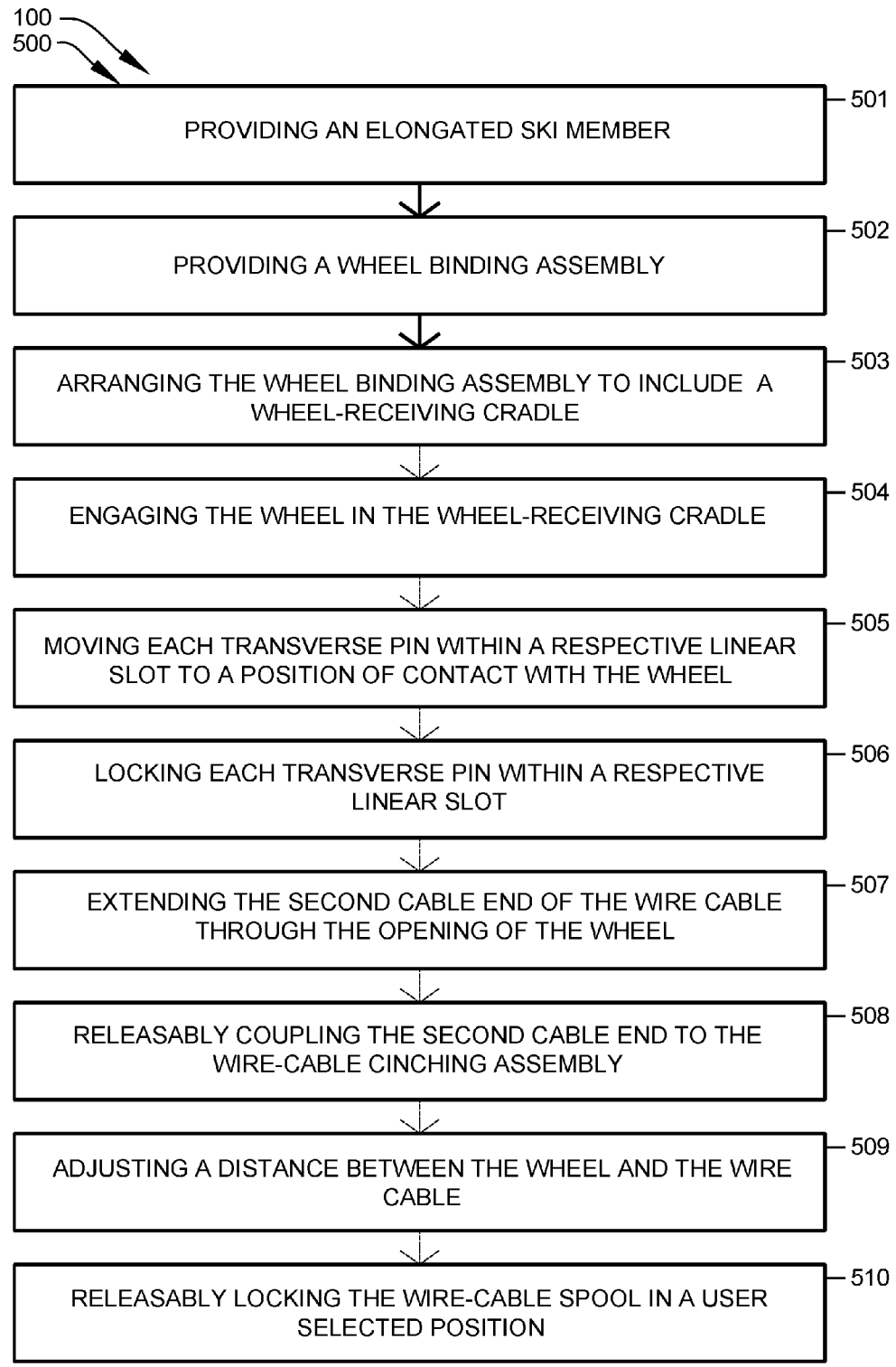
FIG. 15 is a flow diagram illustrating a method of use for an adjustable ski device, according to an embodiment of the present disclosure.

FIG. 14 is a partial side view of the adjustable ski device 100 of FIG. 1, according to an embodiment of the present disclosure. In depicted embodiment of FIG. 13, each one of the opposing sidewalls 118 includes four linear slots 128. At least one portion of the four linear slots 128 are arranged in a vertically-stacked relationship so that a continuous range of horizontal adjustment is available to the user. The double slots of the presently-depicted embodiment accommodate larger-sized wheels. For example, the embodiment of FIG. 14 is suitable for wheels between about 12½ inches to about 21 inches in diameter. In the illustration of FIG. 1, the embodiment of FIG. 14 is shown mounted to larger the rear wheels 101.

All the components that are used are made from corrosion resistant materials and are carefully selected for their functionality in use. The ski members 102 may be constructed from ABS (Acrylonitrile-Butadiene-Styrene) due to its rigidity and resistance to impact properties. A high visibility color may be added or applied to the material for the safety of other pedestrians using snow covered walkways. The low profile wheel-receiving cradles 114 are fabricated from aluminum alloy, or other lightweight, rigid, and durable material.

Referring again to FIG. 1, according to one embodiment, the adjustable ski device 100 may be arranged as a kit. The kit may include the adjustable ski device 100 and may further include a set of instructions 155. The instructions 155 may detail functional relationships in relation to the structure of the adjustable ski device 100 (such that the adjustable ski device 100 can be used, maintained, or the like, in a preferred manner). In addition, the kit may include a storage bag 184 adapted to hold the apparatus when not in use. In addition, the kit may include a wrist leash 185 that is approximately one meter long, which may be fitted low on the stroller frame and to the wrist of the user. This enhances safety in the event of a slip on an incline path. Upon reading this specification, it should be appreciated that, under appropriate circumstances, considering such issues as user preferences, design preference, structural requirements, marketing preferences, cost, available materials, technological advances, etc., other kit arrangements such as, for example, including brand-specific mounting accessories, including spare or replacement parts, including media containing an instructional video or website link, including the stroller or CTS, etc., may be sufficient.

FIG. 12 is a flow diagram illustrating a method 500 relating to the modification of a wheeled vehicle for travel over snow and ice, according to an embodiment of the present disclosure. As illustrated, the method 500 relating to the modification of a wheeled vehicle for travel over snow and ice may include the steps of: step one 501, providing an elongated ski member may have a leading end, a trailing end, an upper surface, and a lower surface, the upper surface and the lower surface extending longitudinally between the leading end and the trailing end; step two 502, providing a wheel binding assembly configured to releasably couple the ski member to a wheel of the wheeled vehicle; step three 503, arranging the wheel binding assembly to include a wheel-receiving cradle configured to receive a portion of the wheel, the receiver may include opposing sidewalls joined by a base wall extending transversely between the sidewalls and longitudinally along the upper surface, a set of linear slots formed within each of the opposing sidewalls, a wire cable may have a first cable end and a second cable end, the second cable end configured to be extendable through an opening of the wheel, a wire-cable cinching assembly configured to adjust a length of the wire cable extending through the wheel; arranging the wire-cable cinching assembly to include a transverse pin slidably engaged within the set of linear slots, the transverse pin may include a first pin end and a second pin end, joined with the first pin end, a releasable wire coupler configured to releasably couple the second cable end to the wire-cable cinching assembly, joined with the second pin end and the first cable end, a wire-cable spool adapted to hold the wire cable in a wound configuration, the wire-cable spool configured such that turning of the wire-cable spool in a first rotational direction reduces the distance between the wheel and the wire cable and turning of the wire-cable spool in a second rotational direction increases the distance between the wheel and the wire cable, a first releasable lock configured to releasably lock the wire-cable spool in a user selected position, and a second releasable lock configured to releasably lock the transverse pin a user selected position within a linear slot of the set; and providing an adjustable ski device by joining the wheel binding assembly to the elongated ski member.

The method 500 may further comprise the steps of step four 504, engaging the wheel in the wheel-receiving cradle of the adjustable ski device; step five 505, moving each transverse pin within a respective linear slot to a position of contact with the wheel; step six 506, locking each transverse pin within a respective linear slot in the position of contact with the wheel using the second releasable lock; step seven 507, extending the second cable end of the wire cable through the opening of the wheel; step eight 508, releasably coupling the second cable end to the wire-cable cinching assembly; step nine 509, adjusting a distance between the wheel and the wire cable by turning the wire-cable spool of the wire-cable cinching assembly in the first rotational direction; and step ten 510, releasably locking the wire-cable spool in a user selected position to maintain the distance between the wheel and the wire cable.

It should be noted that steps 504 through 510 are optional steps and may not be implemented in all cases. Optional steps of method of use 500 are illustrated using dotted lines in FIG. 15 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. §112(f). It should also be noted that, under appropriate circumstances, considering such issues as design preference, user preferences, marketing preferences, cost, structural requirements, available materials, technological advances, etc., other methods for the adjustable ski device 100 (e.g., different step orders within above-mentioned list, elimination or addition of certain steps, including or excluding certain maintenance steps, etc.), are taught herein.

Figure 16:
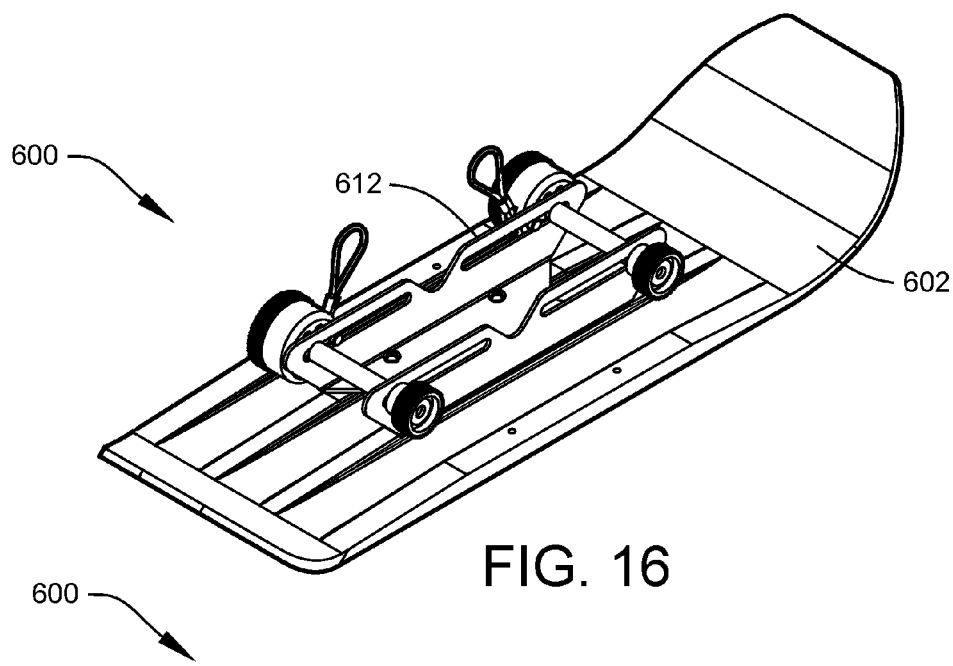
FIG. 16 is a rear perspective view of an alternate adjustable ski device, according to an embodiment of the present disclosure.
Figure 17:
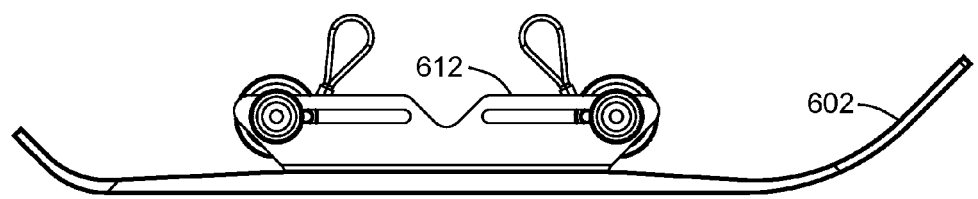
FIG. 17 is a side view of the alternate adjustable ski device of FIG. 16, according to an embodiment of the present disclosure.
Figure 18:
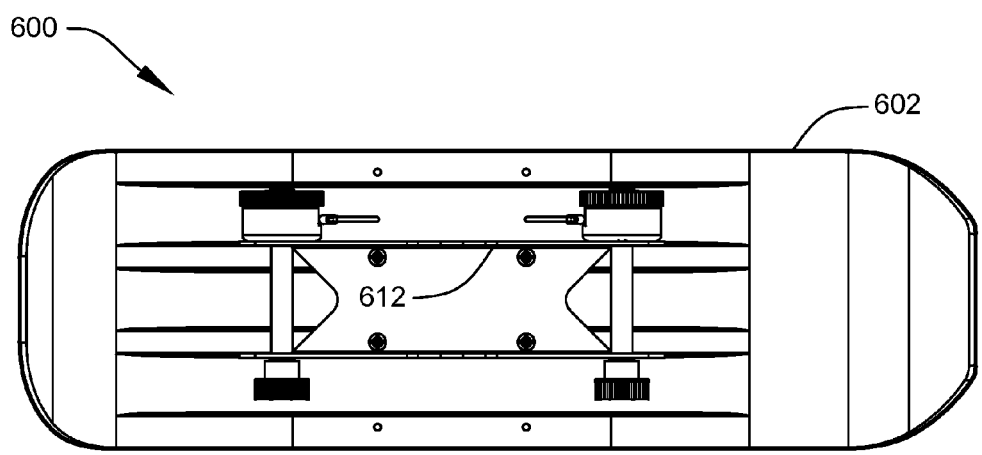
FIG. 18 is a top view of the alternate adjustable ski device of FIG. 16, according to an embodiment of the present disclosure.

FIG. 16 through FIG. 21 describe an alternate adjustable ski device 600, according to another embodiment of the present disclosure. FIG. 16 is a rear perspective view of the alternate adjustable ski device 600, according to an embodiment of the present disclosure. FIG. 17 is a side view of the alternate adjustable ski device 600 of FIG. 16, according to an embodiment of the present disclosure. FIG. 18 is a top view of the alternate adjustable ski device 600 of FIG. 16, according to an embodiment of the present disclosure. FIG. 19 is a rear perspective view of an alternate adjustable ski device, illustrating an alternate configuration 650 of the alternate adjustable ski device 600, according to an embodiment of the present disclosure. FIG. 20 is another top view of the alternate adjustable ski device of FIG. 16, illustrating the alternate configuration 650 of the alternate adjustable ski device, according to an embodiment of the present disclosure. FIG. 21 is a sectional view through the section 21-21 of FIG. 20, further illustrating the alternate configuration 650 of the alternate adjustable ski device 600, according to an embodiment of the present disclosure.

Referring to FIG. 16 through FIG. 21, the alternate ski embodiment 600 is shorter and wider than the prior embodiments to allow the apparatus to fit on four-wheel strollers having shorter and narrower wheel bases compared to the larger wheeled vehicle 103 depicted in FIG. 1. The alternate ski embodiment 600 operates in a manner substantially similar to the embodiment described in FIG. 1 through FIG. 14. Differences between the alternate ski embodiment 600 and the prior embodiment include a smaller wheel binding assembly 612 designed for wheels up to about 12½ inches in diameter.

Distinct features of the alternate ski embodiment 600 include the ability to adjust the mounting position of the wheel binding assembly 612 on the elongated ski member 602. More specifically, the wheel binding assembly 612 may be selectively positioned centrally on the upper surface of the elongated ski member 602 (as shown in FIG. 18) or may be offset to either side of the elongated ski member 602 (as shown in FIG. 20). The value of this feature is that the apparatus may be installed on strollers that have dual wheels 605 (see FIG. 21) as opposed to a single wheel on each leg, as shown in FIG. 1. When used with "dual wheel" strollers the bracket can be offset and one wheel can be place into the wheel binding assembly 612. The other free wheel can sit on top of the elongated ski member 602 and not be left to drag in free space through the snow. The wheel binding assembly 612 may be mechanically fastened to the elongated ski member 602 with screws, as shown.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An adjustable ski device relating to the modification of a wheeled vehicle for travel over snow and ice, the adjustable ski device comprising:
   an elongated ski member having a leading end, a trailing end, an upper surface, and a lower surface, the upper surface and the lower surface extending longitudinally between the leading end and the trailing end;
   mounted to the upper surface, a wheel binding assembly configured to releasably couple the ski member to a wheel of the wheeled vehicle, the wheel binding assembly including
   a wheel receiver configured to receive a portion of the wheel, the receiver including opposing sidewalls joined by a base wall extending transversely between the sidewalls and longitudinally along the upper surface,
   a set of linear slots formed within each of the opposing sidewalls,
   a wire cable having a first cable end and a second cable end, the second cable end configured to be extendable through an opening of the wheel, and
   a wire-cable cinching assembly configured to adjust a length of the wire cable extending through the wheel, the wire-cable cinching assembly including a transverse pin slidably engaged within the set of linear slots, the transverse pin including a first pin end and a second pin end,
joined with the first pin end, a releasable wire coupler configured to releasably couple the second cable end to the wire-cable cinching assembly,
joined with the second pin end and the first cable end, a wire-cable spool adapted to hold the wire cable in a wound configuration, the wire-cable spool configured such that turning of the wire-cable spool in a first rotational direction reduces the distance between the wheel and the wire cable and turning of the wire-cable spool in a second rotational direction increases the distance between the wheel and the wire cable, wherein the wire-cable spool further comprises a cup-shaped outer housing mounted to the transverse pin; and an inner spool rotatably engaged in a nested position within the cup-shaped outer housing; wherein the transverse pin comprises a transverse axis, the cup-shaped outer housing comprises a plurality of receiving sockets arranged in a radial pattern about the transverse axis; and the inner spool comprises at least one outwardly projecting post member, a spring adapted to bias the post member toward a position of engagement with one of the receiving sockets, and a grip adapted to assist manual manipulation of the inner spool by a user, and the inner spool is adapted to translate along the transverse axis between a position of engagement with the outer housing and a rotatable position disengaged from the outer housing, a first releasable lock configured to releasably lock the wire-cable spool in a user selected position, and
a second releasable lock configured to releasably lock the transverse pin in a user selected position within a linear slot of the set.

2. The adjustable ski device of claim 1, wherein each one of the opposing sidewalls includes at least two linear slots.

3. The adjustable ski device of claim 1, wherein each one of the opposing sidewalls includes at least four linear slots.

4. The adjustable ski device of claim 3, wherein at least one portion of the at least four linear slots comprises the slots arranged in a vertically-stacked relationship.

5. The adjustable ski device of claim 1, wherein
each linear slot of the set comprises a longitudinal axis; and
the longitudinal axis of at least two of the linear slots are parallel.

6. The adjustable ski device of claim 1, wherein the linear slots each comprise a length of between about 1 inch and about 12 inches.

7. The adjustable ski device of claim 1, wherein
each linear slot of the set comprises a longitudinal axis; and
the longitudinal axis is substantially parallel with the base wall of the wheel receiver.

8. The adjustable ski device of claim 1, wherein the first releasable lock and the second releasable lock are manually operable without the use of tools.

9. The adjustable ski device of claim 1, wherein each one of the opposing sidewalls includes a cut-out configured to accommodate a hub portion of the wheel.

10. The adjustable ski device of claim 1, wherein the second releasable lock is a self-locking hand-operated nut adapted to prevent the nut from freely unwinding if the nut is loosened.

11. The adjustable ski device of claim 1, wherein the wire cable is constructed from stainless steel.

12. The adjustable ski device of claim 1, wherein
the second cable end of the wire cable includes a loop; and
the releasable wire coupler is configured to releasably engage the loop.

13. The adjustable ski device of claim 1, wherein the first cable end is coupled to the inner spool.

14. The adjustable ski device of claim 1, wherein the first releasable lock is enabled by a user-selected engagement of the post member within one of the plurality of receiving sockets.

15. The adjustable ski device of claim 13, wherein
the first cable end comprises an enlarged stop member;
the inner spool comprises a stop receiver configured to removably receive the enlarged stop member; and
the wire cable may be coupled to and decoupled from the inner spool without the use of tools.

16. An adjustable ski device, the adjustable ski device comprising:
an elongated ski member having a leading end, a trailing end, an upper surface, and a lower surface, the upper surface and the lower surface extending longitudinally between the leading end and the trailing end;
mounted to the upper surface, a wheel binding assembly configured to releasably couple the ski member to a wheel of the wheeled vehicle, the wheel binding assembly including
a wheel receiver configured to receive a portion of the wheel, the receiver including opposing sidewalls joined by a base wall extending transversely between the sidewalls and longitudinally along the upper surface,
a set of linear slots formed within each of the opposing sidewalls,
a wire cable having a first cable end and a second cable end, the second cable end configured to be extendable through an opening of the wheel, and
a wire-cable cinching assembly configured to adjust a length of the wire cable extending through the wheel, the wire-cable cinching assembly including
a transverse pin slidably engaged within the set of linear slots, the transverse pin including a first pin end and a second pin end,
joined with the first pin end, a releasable wire coupler configured to releasably couple the second cable end to the wire-cable cinching assembly,
joined with the second pin end and the first cable end, a wire-cable spool adapted to hold the wire cable in a wound configuration, the wire-cable spool configured such that turning of the wire-cable spool in a first rotational direction reduces the distance between the wheel and the wire cable and turning of the wire-cable spool in a second rotational direction increases the distance between the wheel and the wire cable,
a first releasable lock configured to releasably lock the wire-cable spool in a user selected position, and
a second releasable lock configured to releasably lock the transverse pin at the user selected position within a linear slot of the set;
wherein
each one of the opposing sidewalls includes at least two linear slots;
each linear slot of the set comprises a longitudinal axis and the longitudinal axis of at least two of the linear slots are parallel;
the linear slots each comprise a length of between about 1 inch and about 12 inches;

each linear slot longitudinal axis is substantially parallel with the base wall of the wheel receiver;

the first releasable lock and the second releasable lock are manually operable without the use of tools;

each one of the opposing sidewalls includes a cut-out configured to accommodate a hub portion of the wheel;

the leading end and the trailing end of the of the elongated ski member are upwardly swept;

the wire cable is constructed from stainless steel;

the second cable end of the wire cable includes a loop and the releasable wire coupler is configured to releasably engage the loop;

the wire-cable spool further comprises a cup-shaped outer housing mounted to the transverse pin and an inner spool rotatably engaged in a nested position within the cup-shaped outer housing;

the transverse pin comprises a transverse axis;

the cup-shaped outer housing comprises a plurality of receiving sockets arranged in a radial pattern about the transverse axis and the inner spool comprises at least one outwardly projecting post member, a spring adapted to bias the post member toward a position of engagement with one of the receiving sockets, and a grip adapted to assist manual manipulation of the inner spool by a user;

the inner spool is adapted to translate along the transverse axis between a position of engagement with the outer housing and a rotatable position disengaged from the outer housing;

the first cable end is coupled to the inner spool;

the first releasable lock is enabled by a user-selected engagement of the post member within one of the plurality of receiving sockets; the first cable end comprises an enlarged stop member;

the inner spool comprises a stop receiver configured to removably receive the enlarged stop member; and the wire cable may be coupled to and decoupled from the inner spool without the use of tools.

17. The adjustable ski device of claim 16, wherein the adjustable ski device is arranged as a kit further comprising a set of instructions for the use thereof.

\* \* \* \* \*